United States Patent
Arai et al.

(10) Patent No.: US 12,204,291 B2
(45) Date of Patent: Jan. 21, 2025

(54) TIME TRANSMISSION CORRECTION DEVICE, TIME TRANSMISSION SYSTEM, AND DELAY MEASUREMENT METHOD

(71) Applicant: Nippon Telegraph and Telephone Corporation, Tokyo (JP)

(72) Inventors: Kaoru Arai, Musashino (JP); Hiroki Sakuma, Musashino (JP); Masahiro Nakagawa, Musashino (JP); Shunichi Tsuboi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 650 days.

(21) Appl. No.: 17/299,379

(22) PCT Filed: Nov. 22, 2019

(86) PCT No.: PCT/JP2019/045760
§ 371 (c)(1),
(2) Date: Jun. 3, 2021

(87) PCT Pub. No.: WO2020/116200
PCT Pub. Date: Jun. 11, 2020

(65) Prior Publication Data
US 2022/0026857 A1 Jan. 27, 2022

(30) Foreign Application Priority Data
Dec. 4, 2018 (JP) ................................ 2018-227004

(51) Int. Cl.
*G04G 5/00* (2013.01)
*G04G 7/00* (2006.01)
(Continued)

(52) U.S. Cl.
CPC ............... *G04G 5/002* (2013.01); *G04G 7/02* (2013.01); *G06F 1/14* (2013.01); *H04J 3/0667* (2013.01); *H04L 7/0037* (2013.01)

(58) Field of Classification Search
CPC ............ G04G 5/002; G04G 5/00; G04G 7/05; G04G 7/02; G04R 20/00; G06F 1/14; H04L 7/0037; H04J 3/0667
See application file for complete search history.

(56) References Cited

U.S. PATENT DOCUMENTS 6,236,623 B1 * 5/2001 Read ....................... G04R 20/02
368/46
9,258,106 B2 * 2/2016 Ogawa .................. H04L 7/0016
(Continued)

OTHER PUBLICATIONS

[No Author Listed], "IEEE Standard for a Precision Clock Synchronization Protocol for Networked Measurement and Control Systems," IEEE Std 1588-2008, Revision of IEEE Std 1588-2002, Jul. 24, 2008, 290 pages.

*Primary Examiner* — Edwin A. Leon
*Assistant Examiner* — Kevin Andrew Johnston
(74) *Attorney, Agent, or Firm* — Fish & Richardson P.C.

(57) ABSTRACT

[Problem] To provide a time synchronization mechanism that is not affected by link asymmetry between time synchronization devices.
[Solution] A DC 4 used in a time transmission system that transmits and receives a PTP packet between a master node 1 and a slave node 2 via the DC 4 and synchronizes time of the slave node 2 based on time information on the transmission and reception includes a PTP clock unit 12 that synchronizes time information by the arrived PTP packet, a frequency clock unit 21 that synchronizes time information by a frequency signal, a delay setting unit 22 that sets, such that a transmission delay of the PTP packet between the master node 1 and the slave node 2 becomes a setting delay (Continued)

Lmax, a waiting time of the PTP packet based on a time difference between a departure time of the PTP packet and an arrival time of the PTP packet at the DC 4, which is determined from the time information of the frequency clock unit 21, and a time adjustment unit 26 that corrects a time shift from reference time in the time information of the frequency clock unit 21 based on the time information of the PTP clock unit 12.

3 Claims, 7 Drawing Sheets

(51) Int. Cl.
*G06F 1/14* (2006.01)
*H04J 3/06* (2006.01)
*H04L 7/00* (2006.01)

(56) References Cited

U.S. PATENT DOCUMENTS

| | | | |
|---|---|---|---|
| 2010/0220748 A1* | 9/2010 | Inomata | G06F 1/12 370/503 |
| 2011/0035511 A1* | 2/2011 | Biederman | G04G 7/00 709/248 |
| 2012/0204055 A1* | 8/2012 | Paul | G06F 1/10 713/401 |
| 2013/0028112 A1* | 1/2013 | Mizutani | H04L 43/106 370/252 |
| 2014/0122019 A1* | 5/2014 | Turner | G06F 15/00 702/176 |
| 2015/0085582 A1* | 3/2015 | Kim | G11C 16/10 365/185.18 |
| 2017/0176953 A1* | 6/2017 | Ogawa | H04J 3/0673 |
| 2018/0192387 A1* | 7/2018 | Jung | H04W 48/20 |
| 2020/0120632 A1* | 4/2020 | Tanaka | G01S 19/16 |

* cited by examiner

TIME TRANSMISSION CORRECTION DEVICE, TIME TRANSMISSION SYSTEM, AND DELAY MEASUREMENT METHOD

CROSS-REFERENCE TO RELATED APPLICATIONS

This application is a National Stage application under 35 U.S.C. § 371 of International Application No. PCT/JP2019/045760, having an International Filing Date of Nov. 22, 2019, which claims priority to Japanese Application Serial No. 2018-227004, filed on Dec. 4, 2018. The disclosure of the prior application is considered part of the disclosure of this application, and is incorporated in its entirety into this application.

TECHNICAL FIELD

The present invention relates to a time transmission correction device, a time transmission system, and a delay measurement method.

BACKGROUND ART

A time synchronization technology will be needed in the future in the next-generation mobile communication 5th generation (5G) and the like, in mobile base station cooperation. A time synchronization system is implemented, for example, by a configuration in which grand masters (GMs) that are time reference devices are distributed at respective points. The GM at each point functions as a GNSS receiver that directly receives signals from a global navigation satellite system (GNSS) satellite and distributes the received signals directly to an end application.

However, when the number of high-performance GNSS receivers is increased, costs thereof increase. In addition, time accuracy deteriorates in a time period during which signals cannot be received from the satellite due to bad weather.

Therefore, as a form of distributing information from the GM via a packet network (that is, indirectly receiving a GNSS signal), for example, a precision time protocol (PTP) that performs time synchronization using a packet time stamp has been used (Non Patent Literature 1). In the PTP, time synchronization is performed via a highly reliable network of a telecommunications carrier.

As a result, the reception points and the number of GNSS antennas serving as time reference can be aggregated, and the reliability of the GNSS reception can be improved by with a monitoring function provided to the aggregated GNSS receiver (GM). Further, path duplexing of the packet network can also improve reliability. Furthermore, the GM can superimpose the PTP packet on the main signal, thereby transmitting time information economically and accurately.

Figure 8:
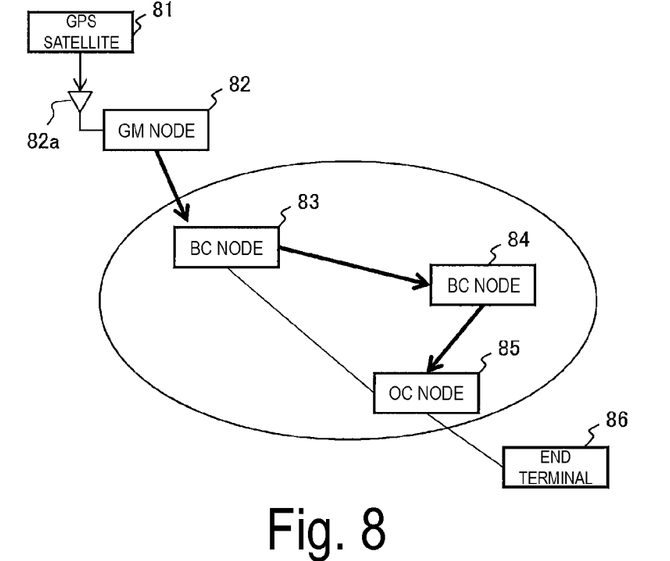
FIG. 8 is a configuration diagram of a time transmission system to which a time synchronization technology is applied.

FIG. 8 is a configuration diagram of a time transmission system to which the time synchronization technology is applied.

The time transmission system is configured in which a GM node 82, which is a PTP-compatible PTP node, boundary clock (BC) nodes 83, 84, and an ordinary clock (OC) node 85 are interconnected via a network.

Figure 9:
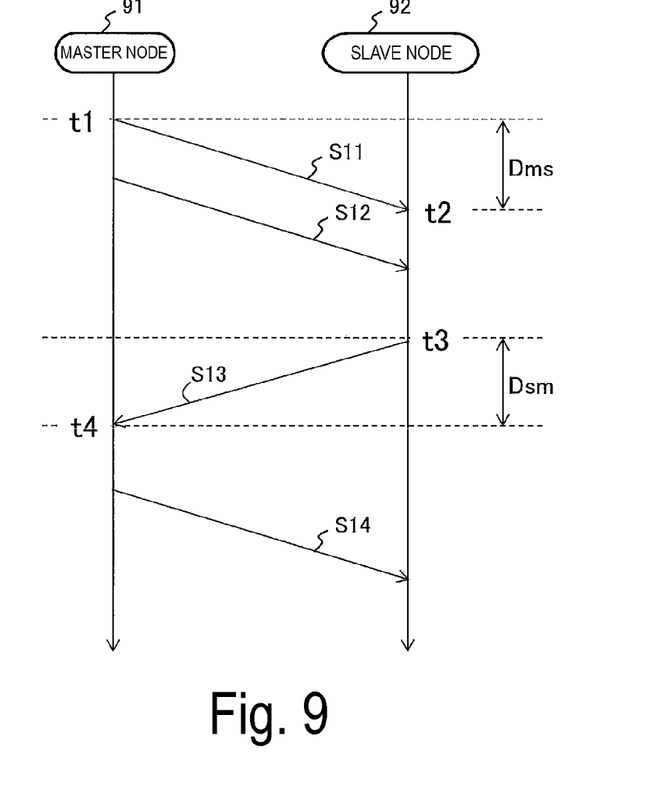
FIG. 9 is a sequence diagram illustrating a mechanism of a PTP.

Hereinafter, between PTP nodes that directly perform time synchronization, the side that provides time information is defined as a master node 91 (FIG. 9), and the side of a synchronized device that receives time information from the master node 91 is defined as a slave node 92 (FIG. 9). The order of propagation of time information is expressed by thick arrows in FIG. 8. The source side of the thick arrow is the uplink side, and the destination side of the thick arrow is the downlink side. That is, accurate time information is propagated downstream in the order of the GM node 82, the BC node 83, the BC node 84, and the OC node 85.

The GM node 82 includes an antenna 82a that directly receives signals from a GPS satellite 81.

The BC node 83 is the slave node 92 that receives time information from the GM node 82, which is the master node 91 and then, functions as the master node 91 that provides time information to the BC node 84.

The BC node 84 is the slave node 92 that receives time information from the BC node 83 and then, functions as the master node 91 that provides time information to the OC node 85.

The OC node 85 is a slave node 92 that receives time information from the BC node 84 and then, provides time information to an end terminal 86.

Note that the difference in the names between the BC nodes 83, 84 and the OC node 85 is that the BC nodes 83, 84 have a plurality of connection ports to other PTP nodes, while the OC node 85 has only one connection port.

FIG. 9 is a sequence diagram illustrating the mechanism of the PTP.

The PTP packet with time information (time stamp) is transmitted and received between the master node 91 and the slave node 92. As the PTP packet, a downlink Sync message (S11), a downlink Follow-up message (S12), an uplink Delay_Request message (S13), and a downlink Delay_Response message (S14) are transmitted and received in this order.

A departure time t1 is the time at which the Sync message (S11) is transmitted from the master node 91. Note that it is difficult to include the departure time t1 of the Sync message in the Sync message itself and thus, the departure time t1 of the Sync message is included in the subsequent Follow-up message and notified to the slave node 92.

An arrival time t2 is the time at which the Sync message arrives at the slave node 92.

A departure time t3 is the time at which the Delay_Request message is transmitted from the slave node 92.

An arrival time t4 is the time at which the Delay_Request message arrives at the master node 91. The arrival time t4 is included in the Delay_Response message for the Delay_Request message and is notified to the slave node 92.

This allows the slave node 92 to recognize all of four time stamps (the departure time t1 to the arrival time t4).

The transmission and reception of the PTP packet generates following propagation delays.

A downlink delay Dms is a propagation delay of the downlink Sync message from the master node 91 to the slave node 92. Given that a shift of a clock of the slave node 92 from a clock of the master node 91 is an offset value, the downlink delay Dms is determined by an equation:

downlink delay $Dms$=(arrival time $t2$−offset value)− departure time $t1$.

An uplink delay Dsm is a propagation delay of the uplink Delay_Request message from the slave node 92 to the master node 91. The Uplink delay Dsm is determined by an equation: uplink delay $Dsm$=arrival time $t4$− (departure time $t3$−offset value).

Assuming downlink delay Dms=uplink delay Dsm, the slave node 92 determines the offset value according to Equation 1 below.

$$\text{Offset value} = ((\text{arrival time } t2 - \text{departure time } t1) - (\text{arrival time } t4 - \text{departure time } t3))/2 \quad \text{(Equation 1)}$$

Then, the slave node 92 corrects the time of the own clock with the determined offset value to synchronize the clock of the slave node 92 with the clock of the master node 91 (time matching).

CITATION LIST

Non Patent Literature

Non Patent Literature 1: The Institute of Electrical and Electronics Engineers, Inc. (IEEE), "IEEE Standard for a Precision Clock Synchronization Protocol for Networked Measurement and Control Systems", IEEE Std 1588-2008, Revision of IEEE Std 1588-2002, Jul. 24, 2008

SUMMARY OF THE INVENTION

Technical Problem

The PTP is a protocol on the assumption that an uplink delay is equal to a downlink delay in the PTP packet transmission path. Thus, when link asymmetry (delay difference between uplink and downlink) occurs, an error occurs in the time synchronization accuracy. Factors of the delay difference between uplink and downlink will be exemplified below.
  (a) As the intra-device delay in the transmission path, for example, buffering in packet processing or fluctuation delay in frame processing.
  (b) Temperature fluctuation in the transmission path.
  (c) In the case of dual fiber bi-directional communication, a difference in fiber length (5 ns/m).
  (d) In the case of single fiber bi-directional communication, when uplink and downlink use different wavelengths, a delay difference is caused by wavelength dispersion. For example, in transmission through a 80 km single-mode fiber at 1500 ns and 1300 ns wavelengths, the delay difference is 130 ns, and the time synchronizing error of the PTP becomes 130/2=65 ns.

Most of components of the delay difference between uplink and downlink are caused by (a) the intra-device delay. Meanwhile, (b) the temperature fluctuation in the transmission path has a longer period than the time synchronization frequency of the PTP and thus, has little effect on the delay. Also, the delay difference due to (c) the difference in fiber length and (d) the different wavelengths is much smaller than the delay difference due to (a) the intra-device delay. Therefore, in order to increase the time synchronization accuracy, the time synchronization mechanism needs to be designed so as to reduce the effect of link asymmetry in consideration of (a) the intra-device delay.

Figure 10:
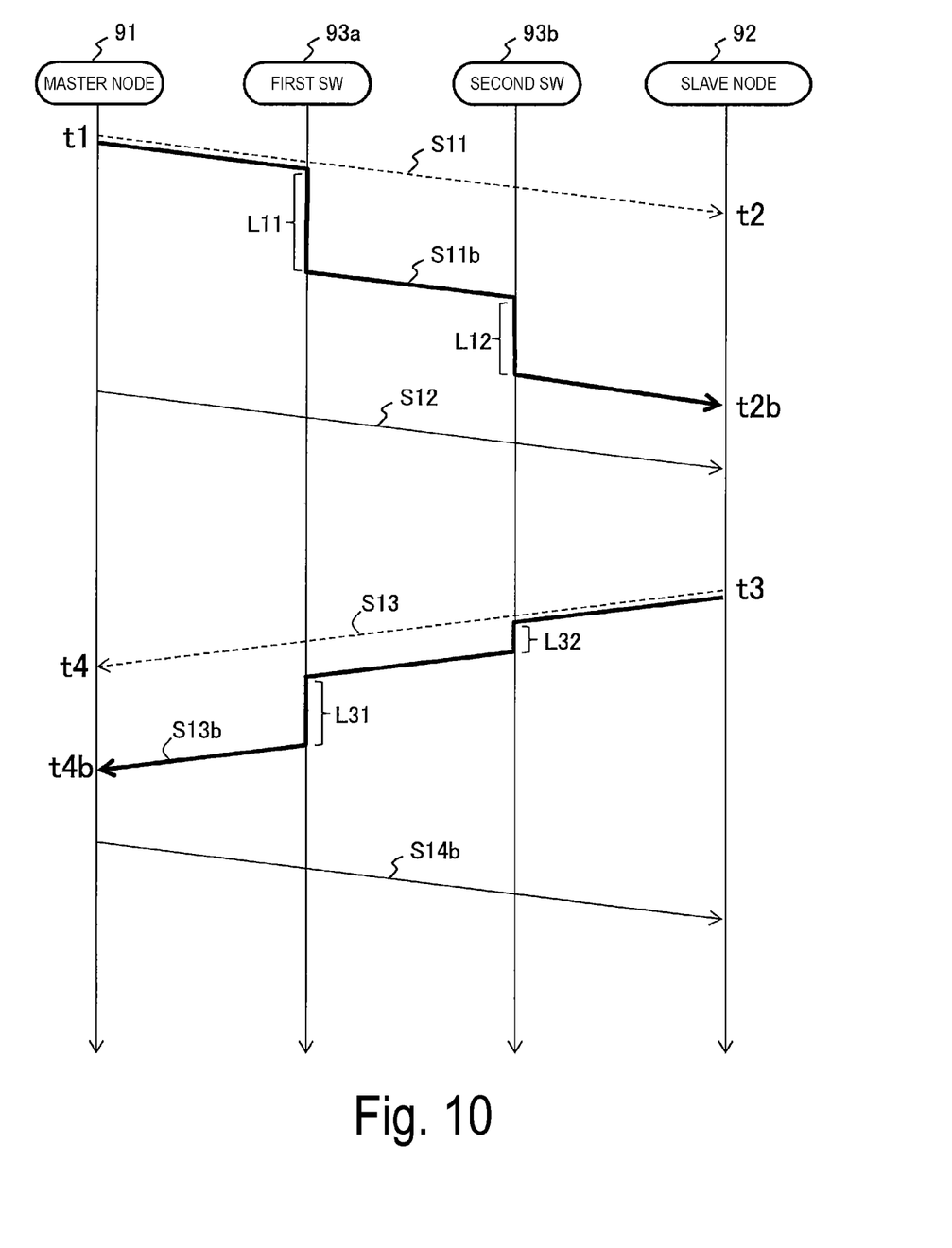
FIG. 10 is a sequence diagram incorporating intra-device delays of transmission devices to FIG. 9.

FIG. 10 is a sequence diagram incorporating intra-device delays of transmission devices to FIG. 9. FIG. 10 illustrates the case where two transmission devices (first SW 93a, second SW 93b) are present between the master node 91 and the slave node 92.

Transmission of the PTP packet in the ideal situation where no intra-device delay in the transmission devices occurs is indicated by dashed arrows (S11, S13), and actual transmission of the PTP packet in the case where intra-device delays in the transmission devices occur is indicated by thick solid arrows (S11b, S13b) with respect to the respective dashed arrows. Actually, the intra-device delay in the transmission devices also occurs in messages in S12 and S14b. However, for the messages in S12, S14b, both the departure time and the arrival time of the PTP node are not used in the calculation of time synchronization and thus, the intra-device delay is assumed to be 0 in FIG. 10.

As the PTP packet, a downlink Sync message (S11b), a downlink Follow-up message (S12), an uplink Delay_Request message (S13b), and a downlink Delay_Response message (S14b) are sequentially transmitted and received.

The Sync message (S11b) is transmitted from the master node 91 to the first SW 93a going to the slave node 92. The first SW 93a generates an intra-device delay L11 from the reception to the transmission of the Sync message. The second SW 93b also generates an intra-device delay L12 from the reception to the transmission of the Sync message. Accordingly, an actual arrival time t2b of the Sync message is delayed from an ideal arrival time t2 by intra-device delays of the two devices.

The Delay_Request message (S13b) is transmitted from the slave node 92 to the second SW 93b going to the master node 91. The second SW 93b generates an intra-device delay L32 from the reception to the transmission of the Delay_Request message. The first SW 93a also generates an intra-device delay L31 from the reception to the transmission of the Delay_Request message. Accordingly, an actual arrival time t4b of the Delay_Request message is delayed from an ideal arrival time t4 by intra-device delays of the two devices. The Delay_Response message (S14b) notifies the slave node 92 of the actual arrival time t4b.

In the situation where the downlink delay Dms is not equal to the uplink delay Dsm as illustrated in FIG. 10, the slave node 92 cannot determine the offset value according to Equation 1 described above. Thus, the slave node 92 instead determines the offset value according to Equation 2 below.

$$\text{Offset value} = ((\text{arrival time } t2 - \text{departure time } t1) - (\text{arrival time } t4 - \text{departure time } t3))/2 + (\text{uplink delay } Dsm - \text{downlink delay } Dms)/2 \quad \text{(Equation 2)}$$

However, the downlink delay Dms and the uplink delay Dsm in the second term in Equation 2 are not necessarily a fixed value, and often vary with time. As for temporal fluctuation, for example, in the second SW 93b, the intra-device delay L12 greatly differs from the intra-device delay L32. This is due to differences in communication direction and the amount of load at processing.

In other words, in the simple PTP specification for determining the offset value only from the time stamp information of the master node 91 and the slave node 92 that are end points of the PTP packet, link asymmetry such as the intra-device delay in the transmission device causes instability in time synchronization accuracy.

Thus, a main object of the present invention to provide a time synchronization mechanism that is not affected by link asymmetry between time synchronization devices.

Means for Solving the Problem

In order to attain the above-described object, a time transmission correction device of the present invention has following features.

The present invention provides a time transmission correction device used in a time transmission system that transmits and receives a time synchronization packet between time synchronization devices via the time transmission correction device, and synchronizes time of each of the time synchronization devices based on time information of the transmission and reception of the time synchronization packet, the time transmission correction device including a first clock unit configured to synchronize first time information by the time synchronization packet arrived, a second clock unit configured to synchronize second time information based on a frequency signal, a delay setting unit configured to set, such that a transmission delay of the time synchronization packet between the time synchronization devices becomes a setting delay, a waiting time of the time synchronization packet based on a time difference between a departure time from one of the time synchronization devices that is a source of the time synchronization packet and an arrival time of the time synchronization packet at the time transmission correction device, the arrival time being determined from the second time information of the second clock unit, and a time adjustment unit configured to correct a time shift from reference time in the second time information of the second clock unit based on the first time information of the first clock unit.

In this way, it is possible to provide the time synchronization mechanism that is not affected by the link asymmetry between time synchronization devices because a certain setting delay that absorbs the link asymmetry between the time synchronization devices is set to the time synchronization packet.

The present invention provides a time transmission system including the time transmission correction device, and the time synchronization devices, in which when one of the time synchronization devices receives the time synchronization packet from another one of the time synchronization devices that is a counterpart for time synchronization, the one of the time synchronization devices uses a departure time and an arrival time of the time synchronization packet between the time synchronization devices to calculate an offset value that is a time shift between the time synchronization devices.

In this way, highly accurate time synchronization can be achieved based on the departure time and the arrival time of the time synchronization packet that is not affected by the link asymmetry between the time synchronization devices.

Effects of the Invention

The present invention can provide a time synchronization mechanism that is not affected by link asymmetry between time synchronization devices.

DESCRIPTION OF EMBODIMENTS

Hereinafter, an embodiment of the present invention will be described in detail with reference to the drawings.

Figure 1:
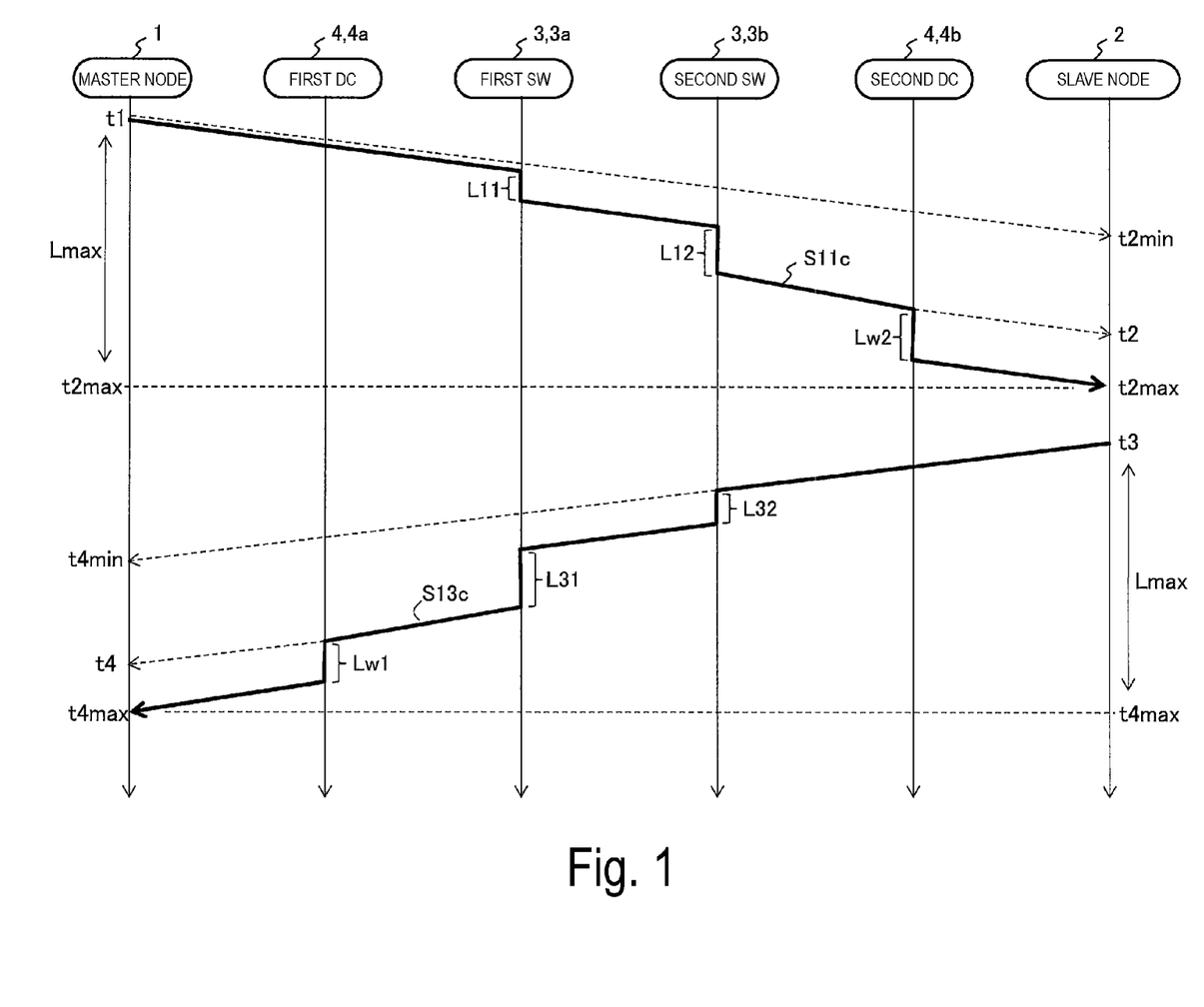
FIG. 1 is a sequence diagram of a time transmission system with link asymmetry removed from a time transmission system in FIG. 10 according to a present embodiment.

FIG. 1 is a sequence diagram of a time transmission system with link asymmetry removed from the time transmission system in FIG. 10.

For the Sync message, S11$b$ in FIG. 10 is replaced with S11$c$ in FIG. 1. For the Delay_Request message, S13$b$ in FIG. 10 is replaced with S13$c$ in FIG. 1. Other messages (S12, S14$b$) in FIG. 1 are the same as the messages in FIG. 10 and thus, are not illustrated in FIG. 1.

FIG. 10 illustrates the configuration in which the PTP packet is propagated downstream in the transmission path in the order of the master node 91, the first SW 93$a$, the second SW 93$b$, and the slave node 92. In FIG. 1, the PTP packet is transmitted in the transmission path as follows.

[Downlink transmission path] master node (time synchronization device) 1-first SW 3$a$-second SW 3$b$-second DC 4$b$-slave node (time synchronization device) 2

[Uplink transmission path] slave node 2-second SW 3$b$-first SW 3$a$-first DC 4$a$-master node 1

Note that the transmission devices such as the first SW 3$a$ and the second SW 3$b$ are referred to as SW 3, and the time transmission correction devices such as the first DC 4$a$ and the second DC 4$b$ are referred to as DC 4.

In the time transmission system in FIG. 1, following processing of the DC 4 is added to FIG. 10.

(1) For the downlink Sync message, the second DC 4$b$ waits a buffer delay Lw2 additionally in the second DC 4$b$ to set an arrival time t2 at the slave node 2 to an arrival time t2max.

(2) For the uplink Delay_Request message, the first DC 4$a$ waits a buffer delay Lw1 additionally in the first DC 4$a$ to set an arrival time t4 at the master node 1 to an arrival time t4max. In other words, (1) and (2) are processing of forcibly aligning each of the downlink delay Dms and the uplink delay Dsm to a setting delay Lmax. As a result, even in the situation where the downlink delay Dms and the uplink delay Dsm of the individual PTP packets do not become constant due to changes in the communication status, communication time of the PTP packet between the PTP nodes becomes the setting delay Lmax. Note that the method of calculating the buffer delays Lw1 and Lw2 will be described below with reference to FIG. 3.

The slave node 2 synchronizes time according to Equation 3 using delayed arrival time t2max and delayed arrival time t4max in addition to the departure time t1 and the departure time t3.

$$\text{Offset value} = ((\text{arrival time } t2max - \text{departure time } t1) - (\text{arrival time } t4max - \text{departure time } t3))/2 \quad \text{(Equation 3)}$$

In this manner, the slave node 2 can use time stamp information in which the intra-device delays in the transmission devices are made uniform with the buffer delays Lw1, Lw2 to achieve accurate time synchronization with reduced effect of link asymmetry.

Figure 2:
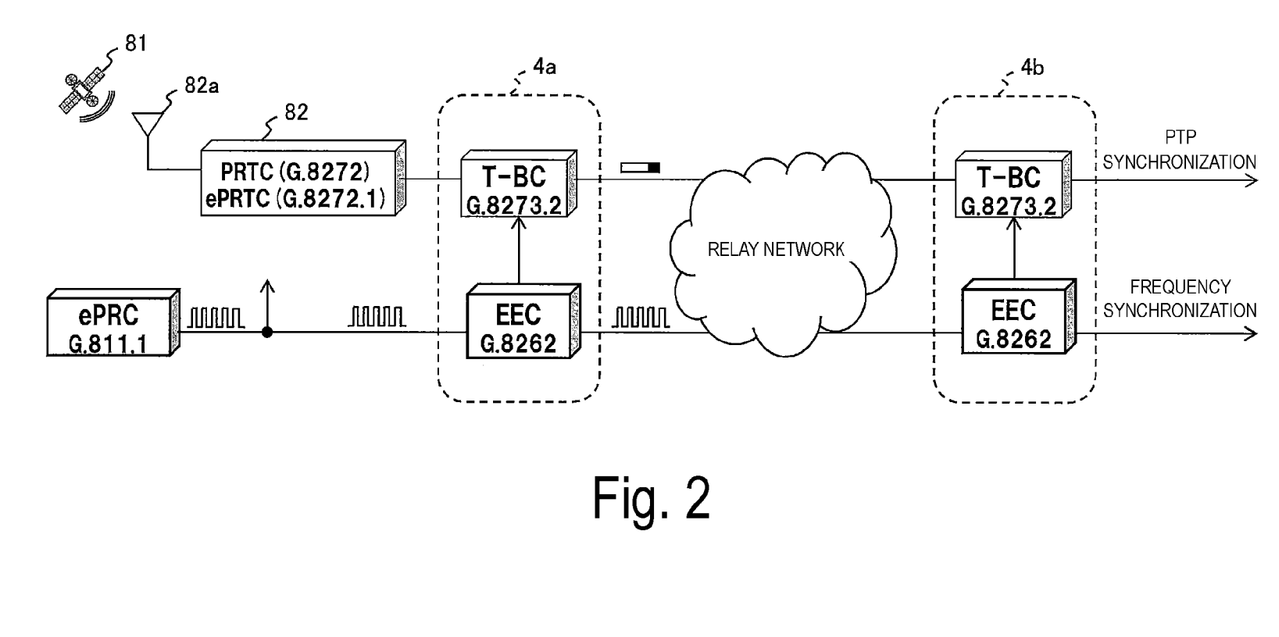
FIG. 2 is a diagram for describing two types of time synchronization schemes (PTP synchronization, frequency synchronization) used in calculation of buffer delays Lw1, Lw2 by each DC according to the present embodiment.

FIG. 2 is a diagram for describing two types of synchronization schemes (PTP synchronization, frequency synchronization) used in the calculation of the buffer delays Lw1, Lw2 by each DC 4.

International Telecommunication Union Telecommunication Standardization Sector (ITU-T), which is the standardization organization, formulates specifications of the synchronization scheme in writing as follows.

(1) The PTP synchronization is the time synchronization scheme based on the PTP packet. As specifications of the PTP synchronization, specifications G.8272 of primary reference time clock (PRTC) and specifications G 8272.1 of enhanced primary reference time clock (ePRTC), implementing the GM node 82 with the antenna 82a that directly receives signals from the GPS satellite 81, and specifications G.8273.2 of telecom boundary clock (T-BC) on the synchronized side have been proposed.

(2) The frequency synchronization is the synchronization scheme implemented with Sync-Ethernet (trade name) or the like based on frequency signals. As specifications of the frequency synchronization, specifications G.811.1 of enhanced primary reference clock (ePRC) that is a high stable atomic clock, and specifications G.8262 of synchronous Ethernet equipment clock (EEC) on the synchronized side have been proposed.

One DC 4 (first DC 4a, second DC 4b) addresses both the two types of time synchronization schemes. That is, two clocks are included in one DC 4 device. The two clocks operate complementarily.

For example, when the GM node 82 cannot receive signals from the GPS satellite 81, the DC 4 maintains time by the high stable atomic clock (ePRC). In addition, when the time synchronization device (T-BC) cannot acquire time information (that is, holdover), time of a long period can be maintained by frequency synchronization (Sync-E).

Note that the accuracy of frequency synchronization is improved with technology advances in clock equipment. For example, the time maintenance period at 100 ns accuracy in a commercial cesium atomic clock was 2.8 hours in 1997, and extended to 28 hours in 2018.

Figure 3:
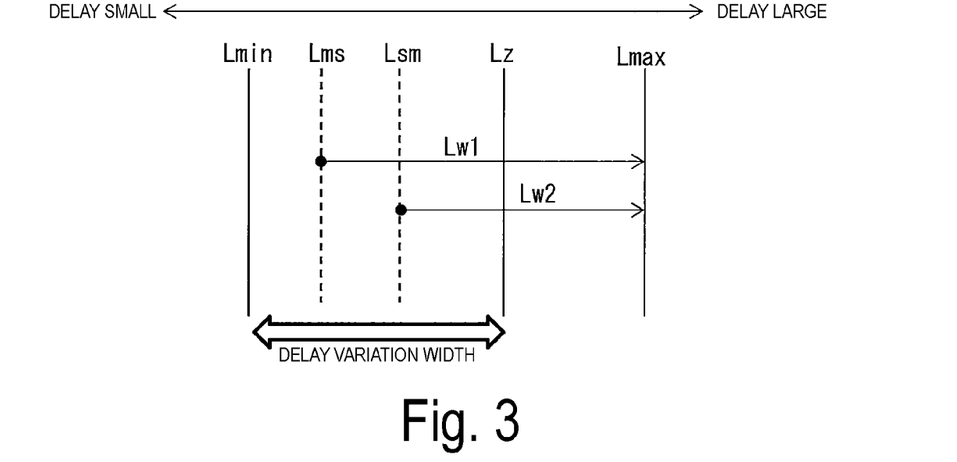
FIG. 3 is a diagram illustrating a method of calculating a buffer delay in the DC according to the present embodiment.

FIG. 3 is a diagram illustrating the method of calculating the buffer delay in the DC 4. The buffer delay Lw1 is calculated as a shortfall of sum of downlink intra-device delays Lms (=L11+L12) for the setting delay Lmax. That is, setting delay Lmax=L11+L12+Lw1 is established.

The buffer delay Lw2 is calculated as a shortfall of sum of uplink intra-device delays Lsm (=L31+L32) for the setting delay Lmax. That is, setting delay Lmax=L31+L32+Lw2 is established.

In this way, delays in the uplink and downlink directions are equalized by causing the PTP packet to wait for the setting delay Lmax in the total transmission path of the PTP packet. Also, PTP packets in the same path have varying delays within the range of a delay variation width (Lmin to Lz) even in communication in the same direction due to network congestion situation at the transmission timing. However, this delay variance of all packets can be resolved by causing the PTP packet to wait for the shortfall for the setting delay Lmax in the DC 4, so that all packets have the same delay to establish link symmetry ex post facto.

Figure 4:
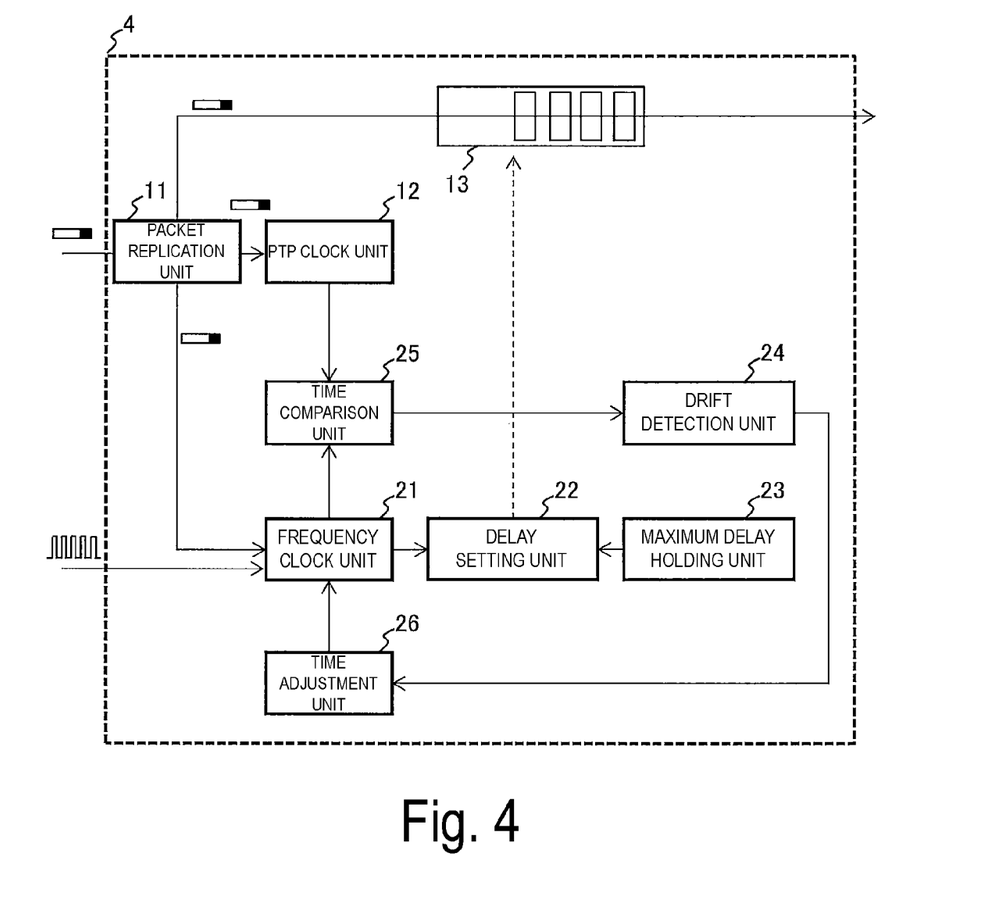
FIG. 4 is a configuration diagram of the delay correct (DC) in FIG. 1 according to the present embodiment.

FIG. 4 is a configuration diagram of the DC 4 in FIG. 1.

The DC 4 is configured as a computer that has a central processing unit (CPU), a storage means (storage unit) such as a memory, a hard disk, a nonvolatile memory, and a solid state drive (SSD), and a network interface.

In this computer, the CPU executes a program (also referred to as an application or an app that is an abbreviation thereof) loaded into a memory, thereby operating a control unit (control means) configured of each processing unit.

The DC 4 has, in addition to the PTP packet transmission function, the function of causing the PTP packet to wait for the buffer delays Lw1, Lw2 such that the transmission time of the PTP packet becomes the setting delay Lmax.

Specifically, the DC 4 includes a packet replication unit 11, a PTP clock unit (first clock unit) 12, a variable buffer 13, a frequency clock unit (second clock unit) 21, a delay setting unit 22, a maximum delay holding unit 23, a drift detection unit 24, a time comparison unit 25, and a time adjustment unit 26.

The packet replication unit 11 makes three copies of the arrived PTP packet, and notifies the PTP clock unit 12, the frequency clock unit 21, and the variable buffer 13 of the three copies, respectively.

The PTP clock unit 12 is a clock supporting the PTP synchronization by the PTP packet. The frequency clock unit 21 is a clock supporting the frequency synchronization by the frequency signal. It is assumed that an initial time of the frequency clock unit 21 is previously adjusted using a simple measurement device with GPS or the like, so as to initially matches the time of the master node 91. Thereafter, the frequency clock unit 21 counts the time by a signal from the ePRC.

As illustrated in FIG. 3, the delay setting unit 22 determines the buffer delays Lw1, Lw2 by following calculation formulas, and sets the results to the variable buffer 13. The following are calculation formulas in the case of calculating the buffer delay Lw2 by the second DC 4b.

(Sum of downlink intra-device delays $Lms$)=(arrival time of the Sync message at the second DC 4b,which is recorded by the frequency clock unit 21 of the second DC 4b)−(departure time $t1$ indicated by the time stamp information in the Sync message)

(Buffer delay $Lw2$ of the variable buffer 13 in the second DC 4b)=(setting delay $L$max read from the maximum delay holding unit 23)−(sum of downlink intra-device delays $Lms$)

The following are calculation formulas in the case of calculating the buffer delay Lw1 by the first DC 4a.

(Sum of uplink intra-device delays $Lsm$)=(arrival time of the Delay_Request message at the first DC 4a,which is recorded by the frequency clock unit 21 of the first DC 4a)−(departure time $t3$ indicated by the time stamp information in the Delay_Request message)

(Buffer delay $Lw1$ of the variable buffer 13 in the first DC 4a)=(setting delay $L$max read from the maximum delay holding unit 23)−(sum of uplink intra-device delays $Lsm$)

It is assumed that the setting delay Lmax illustrated in FIG. 3 is previously registered in the maximum delay holding unit 23 by an administrator or the like.

The variable buffer 13 causes the PTP packet to wait for an additional waiting time from the current time such that the waiting time of the PTP packet in the DC 4 that includes the variable buffer 13 becomes the set buffer delays Lw1, Lw2 and then, transmits the PTP packet.

(Additional waiting time)=(buffer delays $Lw1,Lw2$)+ (arrival time of $PTP$ packet)−(current time)

In addition, a time shift (drift) occurs between the PTP clock unit 12 and the frequency clock unit 21. Thus, as described below, the time of the PTP clock unit 12 is used to correct the time of the frequency clock unit 21. That is, the PTP clock unit 12 can be utilized to detect the long-term shift (drift) of the frequency clock unit 21, contributing to correction of the time of the frequency clock unit 21.

The time comparison unit 25 periodically compares the time of the PTP clock unit 12 with the time of the frequency clock unit 21, and notifies the drift detection unit 24 of comparison results. The drift detection unit 24 detects a difference between the time of the PTP clock unit 12 and the time of the frequency clock unit 21, which are the comparison results, as the drift of the frequency clock unit 21.

The time adjustment unit 26 corrects the time of the frequency clock unit 21 by reflecting the drift amount indicating an degree of the drift detected by the drift detection unit 24 to the frequency clock unit 21.

Figure 5:
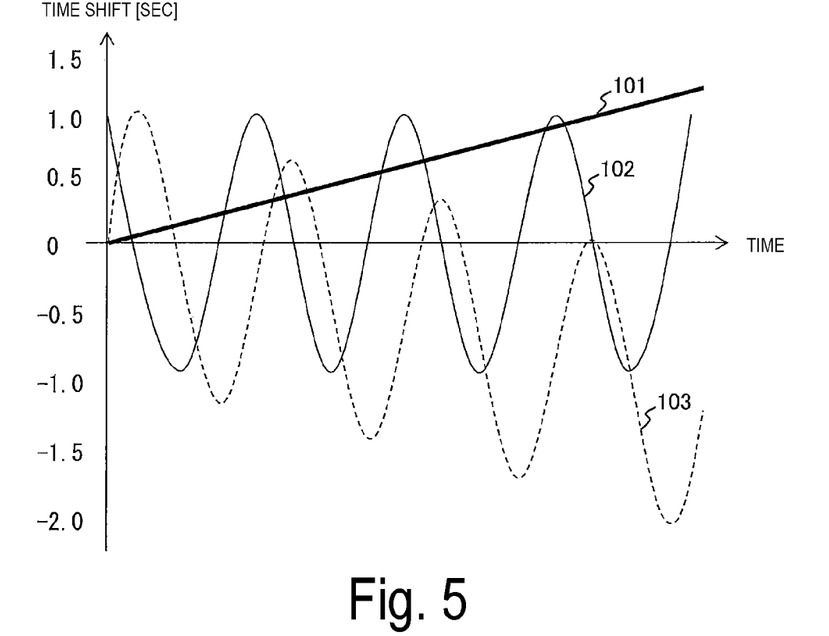
FIG. 5 is a graph illustrating a time shift between two clocks over time according to the present embodiment.

FIG. 5 is a graph illustrating the time shift between the two clocks over time. The Y-axis of the graph denotes the time shift from coordinated universal time (UTC), the positive direction indicates earlier time than the UTC, and the negative direction indicates later time than the UTC. The time shift from the UTC in the PTP clock unit 12 is expressed as a thick solid line 101, and the time shift from the UTC in the frequency clock unit 21 is expressed as a thin solid line 102. Furthermore, a difference between the thick solid line 101 and the thin solid line 102 is expressed as a dashed line 103.

First, at an initial stage (X=0), two clocks are adjusted to the UTC. Due to the variation in transmission delay of the PTP packet, the time shift of the thick solid line 101 fluctuates between the positive direction and the negative direction. As illustrated in FIG. 5, when the traffic fluctuation pattern is periodic, the time of the PTP clock unit 12 varies at a regular period. Thus, the PTP clock unit 12 can be utilized to correct the frequency clock unit 21.

On the contrary, the time shift of the thick solid line 101 is gradually accumulated in the positive direction. This accumulation is due to characteristics of the frequency clock unit 21 that performs frequency-counting. Thus, when the time information of the frequency clock unit 21 is continuously used to calculate the buffer delays Lw1 and Lw2, an absolute value of the dashed line 103 gradually increases, gradually lowering the accuracy of the calculation results.

Figure 6:
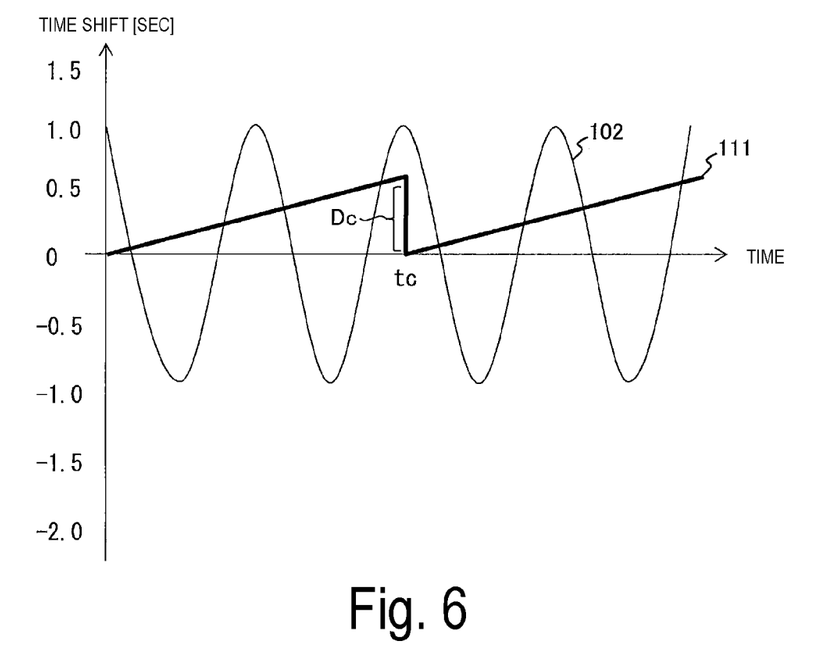
FIG. 6 is a graph illustrating a case of correcting time of a frequency clock unit in the graph of FIG. 5 according to the present embodiment.

FIG. 6 is a graph illustrating the case of correcting the time of the frequency clock unit 21 in the graph of FIG. 5.

The corrected time shift from the UTC in the PTP clock unit 12 is expressed as a thick solid line 111. At a time tc, the time adjustment unit 26 reflects a drift amount Dc detected by the drift detection unit 24 to the frequency clock unit 21 (delays by Dc) to adjust the time of the frequency clock unit 21 to the UTC. As a result, the calculation accuracy of the delay setting unit 22 is recovered at the time tc.

Note that the drift amount Dc specified by the drift detection unit 24 may be a correction value estimated from time elapsed from the previous time coinciding with the UTC, instead of using the time difference between the two clocks. Additionally, the frequency at which the time adjustment unit 26 adjusts the time of the frequency clock unit 21 to the UTC may be set low such that the higher the accuracy of the frequency synchronization of the frequency clock unit 21 is, the longer it may not be necessary to make correction.

Figure 7:
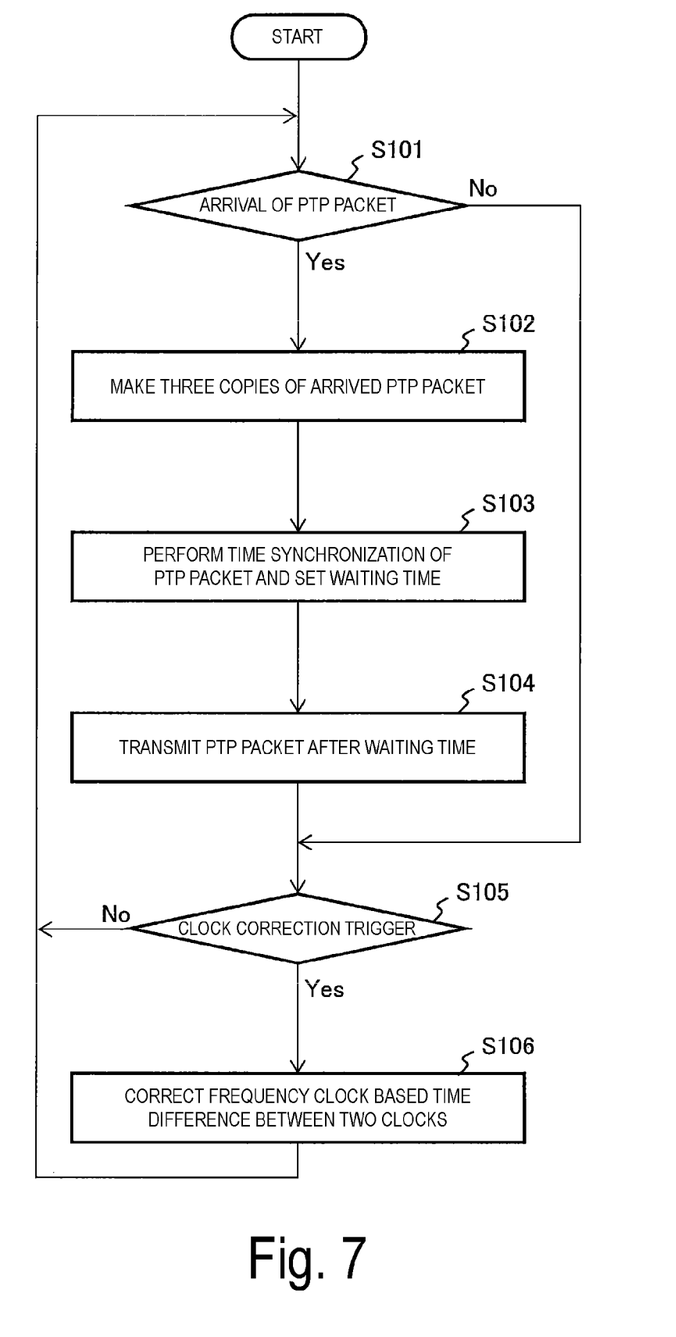
FIG. 7 is a flowchart illustrating operation of the DC according to the present embodiment.

FIG. 7 is a flowchart illustrating the operation of the DC 4.

In S101, the packet replication unit 11 determines whether a PTP packet has arrived. The processing proceeds to S102 when Yes is selected in S101, and proceeds to S105 when No is selected.

In S102, the packet replication unit 11 makes three copies of the arrived PTP packet and notifies the PTP clock unit 12, the frequency clock unit 21, and the variable buffer 13 of the three copies, respectively.

In S103, the PTP clock unit 12 performs time synchronization using the arrived PTP packet, and the delay setting unit 22 calculates the buffer delays Lw1, Lw2 based on the arrival time of the PTP packet, which is recorded by the frequency clock unit 21, and sets a waiting time to the variable buffer 13 based on the calculation results.

In S104, the variable buffer 13 transmits the PTP packet to the outside after an elapse of the waiting time.

In S105, the time comparison unit 25 determines whether a correction trigger has occurred based on the set correction frequency. The processing proceeds to S106 when Yes is selected in S105, and returns to S101 when No is selected.

In S106, the time adjustment unit 26 corrects the frequency clock unit 21 based on the drift amount of the time difference between the two clocks.

In the time transmission system of the present embodiment described above, the frequency clock unit 21 measures one-way delay time of each PTP packet. The delay setting unit 22 determines a difference between the one-way delay time and the setting delay Lmax (a sufficiently longer time than an actual delay) initially set by a maintenance personnel, and sets the buffer delays Lw1, Lw2 to the variable buffer 13 such that the packet waits the difference. In other words, instead of directly determining the intra-device delays L11, L12, L31, and L32 of the PTP-incompatible device (SW 3), which main factor among the delay fluctuation factors, the PTP packet waits at the DC 4 located in the course of the path until sum of the intra-device delays of the PTP packet become the setting delay Lmax.

As a result, because all PTP packets are controlled to have the setting delay Lmax previously set by the maintenance personnel, uplink and downlink delays can be effectively equalized. Thus, the uplink/downlink asymmetry, which is a factor of the time synchronization error, can be removed from the PTP packet after waiting, thereby achieving highly accurate PTP time synchronization by the slave node 2.

Note that, in the present embodiment, the transmission path passing through the two SWs 3 (first SW 3a, second SW 3b) as illustrated in FIG. 1 in the uplink direction as well as in the downlink direction is exemplified as the time transmission system. However, the number of the SWs 3 is not limited, and any number of SW 3 may be used.

In the present embodiment, a program can cause hardware resources of a general-purpose computer to operate as means of the SW 3. This program may also be distributed over a communications line or may be recorded and distributed on a recording medium such as a CD-ROM.

REFERENCE SIGNS LIST

1 Master node (time synchronization device)
2 Slave node (time synchronization device)
3 SW
4 DC (time transmission correction device)
11 Packet replication unit
12 PTP clock unit (first clock unit)
13 Variable buffer
21 Frequency clock unit (second clock unit)
22 Delay setting unit 23 Maximum delay holding unit
24 Drift detection unit
25 Time comparison unit
26 Time adjustment unit
81 GPS satellite
82a Antenna
82 GM node
83, 84 BC node
85 OC node

The invention claimed is:

1. A time transmission correction device used in a time transmission system configured to transmit and receive a time synchronization packet between time synchronization devices via the time transmission correction device, and synchronize time of each of the time synchronization devices based on time information of the transmission and reception of the time synchronization packet, the time transmission correction device comprising:
   a packet replication unit configured to receive a time synchronization packet in a downlink path from a master node to a slave node or in an uplink path from a slave node to a master node;
   a first clock unit configured to synchronize first time information using the time synchronization packet arrived at the time transmission correction device;
   a second clock unit configured to synchronize second time information based on a frequency signal;
   a delay setting unit configured to set a waiting time of the time synchronization packet, wherein setting the waiting time comprises:
      (a) determining an intra-device delay using a time difference between (i) a departure time from a source of the time synchronization packet, wherein the master node is the source of the time synchronization packet in the downlink path, the slave node is the source of the time synchronization packet in the uplink path, and (ii) an arrival time of the time synchronization packet at the time transmission correction device, the arrival time being determined from the second time information of the second clock unit,
      (b) obtaining a predetermined setting delay that is a maximum transmission delay between the master node and the slave node in both uplink and downlink directions, and
      (c) determining the waiting time at the time transmission correction device using the predetermined setting delay minus the intra-device delay; and
   a time adjustment unit configured to correct a time shift from reference time in the second time information of the second clock unit based on the first time information of the first clock unit.

2. A time transmission system comprising:
   the time transmission correction device according to claim 1; and
   the time synchronization devices, wherein
   when one of the time synchronization devices receives the time synchronization packet transmitted from another one of the time synchronization devices that is a counterpart for time synchronization, the one of the time synchronization devices uses a departure time and an arrival time of the time synchronization packet between the time synchronization devices to calculate an offset value that is a time shift between the time synchronization devices.

3. A delay measurement method performed by a time transmission system that is configured to transmit and receive a time synchronization packet between time synchronization devices via a time transmission correction device, and synchronize time of each of the time synchronization devices based on time information of the transmission and reception of the time synchronization packet, the time transmission correction device including a first clock unit, a second clock unit, a delay setting unit, and a time adjustment unit, the method comprising:
   receiving a time synchronization packet in a downlink path from a master node to a slave node or in an uplink path from a slave node to a master node;
   synchronizing, by the first clock unit, first time information using the time synchronization packet;
   synchronizing, by the second clock unit, second time information based on a frequency signal;
   setting, by the delay setting unit, a waiting time of the time synchronization packet, wherein setting the waiting time comprises:
      (a) determining an intra-device delay using a time difference between (i) a departure time from a source of the time synchronization packet, wherein the master node is the source of the time synchronization packet in the downlink path, the slave node is the source of the time synchronization packet in the uplink path, and (ii) an arrival time of the time synchronization packet at the time transmission correction device, the arrival time being determined from the second time information of the second clock unit,
      (b) obtaining a predetermined setting delay that is a maximum transmission delay between the master node and the slave node in both uplink and downlink directions, and
      (c) determining the waiting time at the time transmission correction device using the predetermined setting delay minus the intra-device delay; and
   correcting, by the time adjustment unit, a time shift from reference time in the second time information of the second clock unit based on the first time information of the first clock unit.

* * * * *